United States Patent
Gong et al.

(12)

(10) Patent No.: US 8,905,697 B2
(45) Date of Patent: Dec. 9, 2014

(54) THERMAL BREAK FASTENER

(71) Applicant: Illinois Tool Works Inc., Glenview, IL (US)

(72) Inventors: Yongping Gong, Wilmette, IL (US); Alicia Wieder, Willowbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 13/652,190

(22) Filed: Oct. 15, 2012

(65) Prior Publication Data

US 2013/0280013 A1    Oct. 24, 2013

Related U.S. Application Data

(60) Provisional application No. 61/637,118, filed on Apr. 23, 2012.

(51) Int. Cl.
*F16B 23/00*    (2006.01)

(52) U.S. Cl.
USPC ............... 411/397; 411/387.1; 411/371.1

(58) Field of Classification Search
USPC ......... 411/387.2, 396, 366.2, 372.6, 371.1, 411/366.1, 387.1, 367, 369, 397, 373, 374, 411/383, 384, 386, 388, 389; 52/512, 513
IPC .............................. E04B 3/3606; F16B 25/094
See application file for complete search history.

(56) References Cited

U.S. PATENT DOCUMENTS

| | | | | |
|---|---|---|---|---|
| 2,741,289 A | * | 4/1956 | Harlow | 411/185 |
| 3,682,507 A | * | 8/1972 | Waud | 411/413 |
| 4,074,501 A | * | 2/1978 | Sandqvist | 52/741.4 |
| 4,186,645 A | * | 2/1980 | Zaydel | 411/55 |
| 4,621,963 A | * | 11/1986 | Reinwall | 411/369 |
| 4,726,164 A | * | 2/1988 | Reinwall et al. | 52/410 |
| 5,177,922 A | * | 1/1993 | Ovaert et al. | 52/410 |

(Continued)

FOREIGN PATENT DOCUMENTS

| | | |
|---|---|---|
| DE | 2611395 B1 | 7/1977 |
| DE | 19519623 A1 | 12/1996 |

(Continued)

OTHER PUBLICATIONS

International Search Report for PCT/US2013/036717 dated Jul. 12, 2013.

*Primary Examiner* — Gary Estremsky
(74) *Attorney, Agent, or Firm* — Levenfeld Pearlstein, LLC (57) ABSTRACT

A thermal break fastener includes a head that has a top side and an underside. The head has diameter. A shank depends from the underside of the head and has an end that has a longitudinal bore therein, opposite the head. The shank is formed from a thermally non-transmissive material. The shank has a diameter less than the diameter of the head. A seal is positioned on the shank. A driving/boring element has a driving point and a self-counter-bore cutter spaced from the driving point. The self-counter-bore cutter has a diameter about equal to the diameter of the shank. The driving/boring element is mounted to the shank with the self-counter-bore cutter disposed at about the end of the shank opposite the head. A two-piece configuration includes a driving/boring element including a self-counter-bore cutter and a separate a sealing head with a seal positioned on the sealing head.

19 Claims, 6 Drawing Sheets

(56) References Cited

U.S. PATENT DOCUMENTS

| | | | |
|---|---|---|---|
| 5,426,905 A * | 6/1995 | Rollhauser et al. | 52/512 |
| 5,622,464 A * | 4/1997 | Dill et al. | 411/399 |
| 6,394,725 B1 * | 5/2002 | Dicke | 411/399 |
| 6,662,511 B1 * | 12/2003 | Alty | 52/202 |
| 7,293,947 B2 * | 11/2007 | Craven | 411/387.2 |
| 2009/0133357 A1 | 5/2009 | Richards | |
| 2011/0047919 A1 | 3/2011 | Hohmann, Jr. | |
| 2012/0266560 A1 * | 10/2012 | Panasik et al. | 52/783.1 |

FOREIGN PATENT DOCUMENTS

| | | |
|---|---|---|
| DE | 20203278 U1 | 5/2002 |
| EP | 2431618 A1 | 3/2012 |
| WO | 02079656 A1 | 10/2002 |

* cited by examiner

THERMAL BREAK FASTENER

CROSS-REFERENCE TO RELATED APPLICATION DATA

This application claims the benefit of priority of Provisional U.S. Patent Application Ser. No. 61/637,118, filed Apr. 23, 2012, the disclosure of which is incorporated by reference in its entirety.

BACKGROUND

Insulated metal panels (IMPs) are often used as roofing panels, wall panels and the like. In an IMP has thin gauge steel panels with a layer of insulation between the steel panels. The insulation layer is typically about two to six inches in thickness, but can be of any thickness.

In a typical roofing IMP installation, the panel (which is prefabricated), is laid on the underlying structure, for example, the steel deck of a roof. Holes are drilled through the top steel panel and insulation. Self-drilling screws are then inserted through the top panel and insulation and are used to fasten the bottom steel panel to the underlying steel deck.

Next, insulant is then added to fill the space within the hole that was created. Last the holes are covered with a membrane patch and hot air welded to the surrounding membrane. In a typical wall IMP installation, the panel is laid on steel studs. A long self-tapping screw (which requires pre-drilled holes through the IMP and the steel stud), or a long self-drilling screw is used to fasten the IMP to the steel studs. The screws act as thermal bridges, which carry energy from the interior to the exterior of the building and accelerate energy lose. As will be appreciated, the fastening process also involves several time consuming steps and, if the membrane patch is not properly installed can result in compromising the integrity and insulative properties of the insulation and the panel.

Accordingly there is a need for an improved fastener that provides a thermal break between the conductive materials of the fastener and does not damage the insulation during installation. Desirably, such a fastener securely fastens an IMP to a secondary structure, reduces the labor required, and does not compromise the high integrity or efficiency of the panel.

BRIEF SUMMARY

A fastener for use with insulated metal panels fastens together insulated metal panels to a secondary substructure, such as a steel deck. Installation of a traditional fastener involves multiple steps resulting in a time consuming procedure as well as potentially compromising the thermal efficiency of the insulated metal panel.

The present thermal break fastener includes a drive head, a seal, a thermal efficient and nonconductive shank, and a driving/boring element. Together these components form a single thermally efficient unit.

The head of the fastener includes a top side and an underside. The head has a recess to accept a drive bit, such as a Phillips-style driving bit, square-style driving bit or the like. The head also includes a recess located along its underside.

A shank portion is formed depending from the head and extends longitudinally away from the head. The shank portion is made of a rigid, thermally non-transmissive material.

A seal is positioned on the shank. The seal is generally circular in shape and formed of an elastomeric material. The seal fits over the shank, a retaining element, and rests against the underside of the head.

The retaining element is positioned on the shank, below the underside of the head. The retaining element can be an outwardly projecting ring or can be a series of projections or the like that extend outwardly from the surface of the shank.

A driving/boring element is positioned at the terminal end of the fastener, opposite the head. The driving/boring element has two portions separated by a self-counter-bore cutter. The first portion engages the shank and the second portion has a self-drilling tip to facilitate penetration and installation of the IMP to the secondary substructure. The first portion can be threaded or can have rings or the like to secure the driving/boring portion to the shank. The second portion can be threaded to the self-drilling tip.

The self-counter-bore cutter is generally circular in shape and has a diameter that is greater than the shank, but less than the diameter of the seal and the head. A series of teeth are located around the periphery of the body so that the teeth contact the surface prior to the body to cut a hole for the body.

In use, the self-drilling tip is positioned on the top steel panel of the IMP and is driven into the IMP using a driving tool. The cutter then engages the top steel panel of the IMP cutting through the panel and insulation, boring an opening in the IMP about the same as the diameter of the cutter. Further driving of the fastener drives the point through the bottom steel panel and substructure until the cutter contacts the bottom steel panel. The fastener is then driven such that the head and the seal are flush with the top steel panel.

To maintain the fastener as a compact, efficient thermal break unit, the individual components are collinear with each other.

An alternate embodiment of the thermal break fastener is a two-piece configuration that includes a driving/boring element having a drive head and a penetrating tip at an end opposite the drive head. The driving boring element includes a self-counter-bore cutter spaced from the penetrating tip. The self-counter-bore cutter has a diameter.

The fastener includes a sealing head having a cap portion having a diameter greater than the diameter of the self-counter-bore cutter. A stem portion depends from the cap portion and a securing element extends from the stem portion. A seal is positioned on the sealing head.

The cap portion can include a recess on an underside thereof, and the securing element defines a gap between an end of the securing element and the recess. The seal is positioned in the gap.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 1:
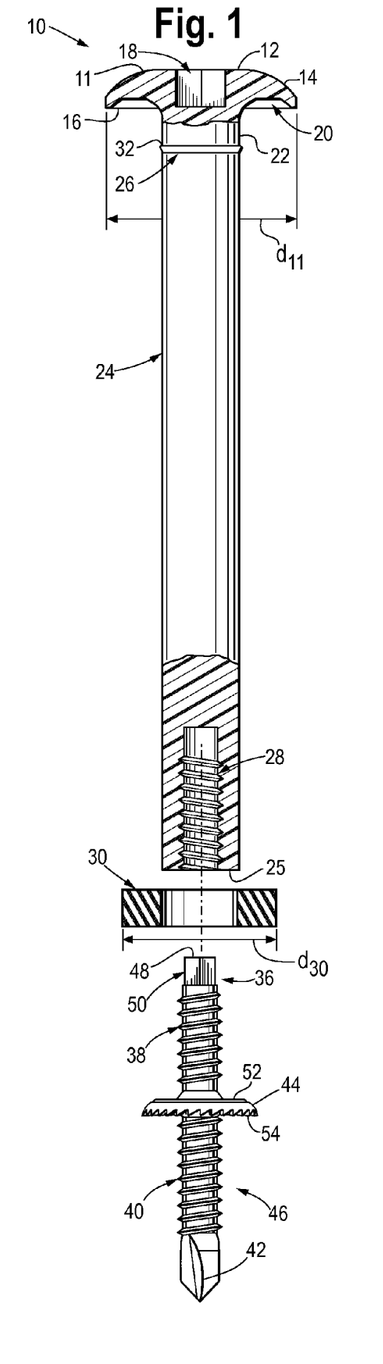
FIG. 1 is an exploded side view of one embodiment of the thermal break fastener shown partially broken away.
Figure 2:
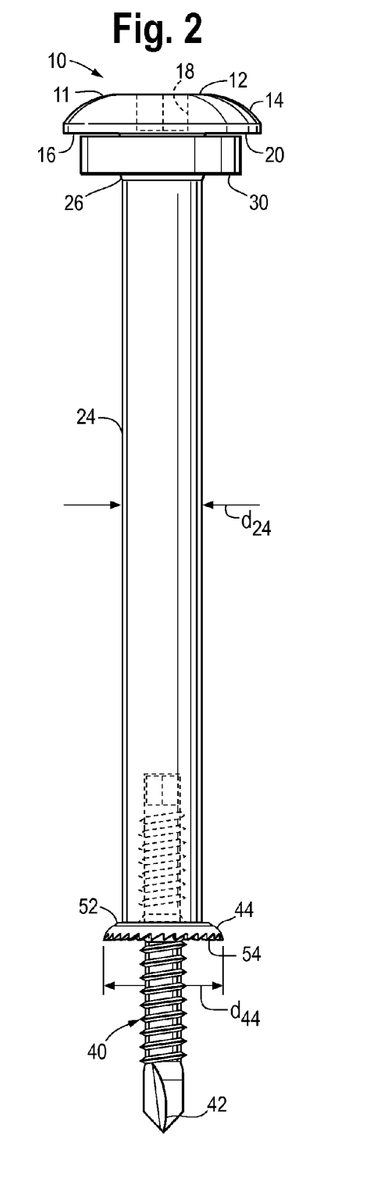
FIG. 2 is a side view of the thermal break fastener of FIG. 1 in an assembled form.

Referring to the figures and in particular to FIGS. 1 and 2, there is shown an embodiment of the thermal break fastener 10. The fasteners 10 include generally, a drive head 11, a seal 30, a shank 24, and a driving/boring element 36. As will be discussed in more detail below, the drive head 11, seal 30, shank 24, and driving/boring element 36, together form the thermal break fastener 10.

FIGS. 1-2 illustrate the drive head 11, which in an embodiment, has a generally circular top side 12 and a rounded edge 14, and defines an underside 16. The head 11 has a rounded edge 14 that extends along the circumference of a top side 12. The head 11 has a drive recess to accept a drive bit, such as a Phillips-style driving bit, a hexagon drive bit or the like. Alternatively, the drive head 11 can be formed with an angled formation extending away from the top surface, such as a hex bolt (not shown). The drive portion 18 is positioned on the top side 12 of the head 11. A portion of the head 11 extends from the top side 12 and bevels downward to form a lip 20.

The head 11 includes a recess 22 formed in the underside 16 thereof. The recess 22 is defined by an overhand of the edge 14 that extends slightly downwardly from the edge 20.

The shank 24 is formed depending from the head 11. In an embodiment, the shank 24 and head 11 are formed as a single (integral) member. Alternately, the head 11 and shank 24 can be formed as separate members that are joined to one another.

The shank 24 is formed as an elongated cylindrical member. A retaining element 26 is formed on the shank 24, near the head 11. The shank 24 can be formed as a solid element with a central longitudinal bore 28 extending partially into a bottom end of the shank 24, opposite the head 11. The shank 24 can also be formed as a substantially hollow member.

The shank 24 is formed from a rigid, thermally non-transmissive or non-conductive material. That is, the shank 24 is formed from a material that is resistant to heat transfer. In an embodiment, the shank 24 is formed from a polymeric material, such as a nylon, polyethylene terephthalate or the like. Those skilled in the art will recognize the side variety of materials from which the shank 24 can be formed. As will be described below, the material must be sufficiently rigid and strong to allow it to be driven by a dive tool (such as a screw gun) so as to have a drive end driven into a steel substructure.

A seal 30, such as the illustrated washer is positioned on the shank 24. The seal 30 is generally circular in shape and can also be formed from a variety of materials, such as neoprene, ethylene propylene diene monomer (EPDM) or other suitable elastomeric materials that can be used to form such a seal and to withstand the environs without undue changes in physical and/or chemical properties. A present seal 30 has a square or rectangular cross-section. The seal 30 fits over and around the anti-back out collar and the gusset.

The seal 30 can be snug up to the recess 22 in the head 10 and is retained in place by the retaining element 26. The retaining element 26 can be an outwardly projecting ring 32, as illustrated, or a series of projections (not shown) or the like that extend outwardly from the surface of the shank 24. The retaining element 26 maintains the seal 30 in place during manufacture, storage, handling and installation. Once the fastener 10 is in place, e.g., holding the panel in place on the structure, the seal 30 will be captured between the top of the panel (the membrane) and the fastener head 11. In a present embodiment, the seal 30 is sized so as to fit within the recess.

As shown in FIGS. 1 and 2, the driving/boring element 36 includes a first securing portion 38, such as the illustrated thread, a second threaded portion 40 with a self-drilling point 42, and a self-counter-bore cutter 44 between the first 38 and second 40 threaded portions. The self-counter-bore cutter 44 is located at a predetermined longitudinal position along the body 46.

The first threaded portion 38 at a first end 48 has a hexagonal shaped end 50 contiguous with the threaded screw portion 38. The first threaded portion 38 is threadedly engaged with the shank bore 28 to secure the driving/boring element 36 to the shank. The first securing portion 38 can be formed with a thread, as illustrated, or with other securing elements, such as rings or the like, to secure the driving/boring 36 element in shank 24.

The second threaded portion 40 is a driving portion that penetrates and is driven through the steel deck and into the substructure. As illustrated, the driving portion includes a self-drilling tip 42 or point to facilitate penetration and installation of the IMP.

The self-counter-bore cutter 44 is located along the driving/boring element 36, between the first and second threaded portions 38,40 and separates the threaded portions. The cutter 44 is generally circular in shape and has a diameter $d_{44}$ that is greater than the diameter $d_{24}$ of shank 24, but less than the diameter $d_{30}$ of the seal 30 and the diameter $d_{11}$ of the head 11. The cutter 44 includes a flat, disc-like body 52 that extends outward from the driving/boring element 36. A series of teeth 54 are located around the periphery of the body 52. The teeth 54 can be formed or angled so as to depend or extend downwardly from the body 52, so that the teeth 54 contact the surface prior to the body 52 (to cut a hole for entry of the body). The teeth 54 engage the surface material and cut an opening equal to the diameter $d_{44}$ of the bore cutter 44. When the driving/boring element 36 is fully engaged with the shank 24, the cutter 44 sits flush against the end 25 of the shank 24.

An alternate embodiment of the fastener 110 is illustrated in FIGS. 3-6 In this embodiment, the shank 124 (except for the head and retaining element) and the driving/boring element 136 are the same as those of the prior embodiment.

Figure 3:
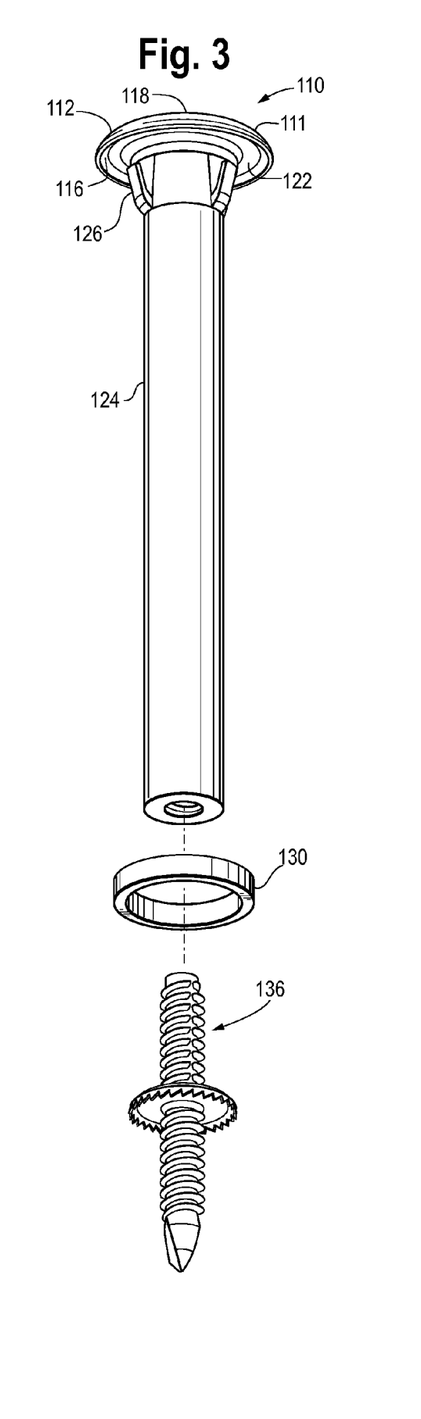
FIG. 3 is an exploded view of an alternative embodiment of the of the thermal break fastener.
Figure 4:
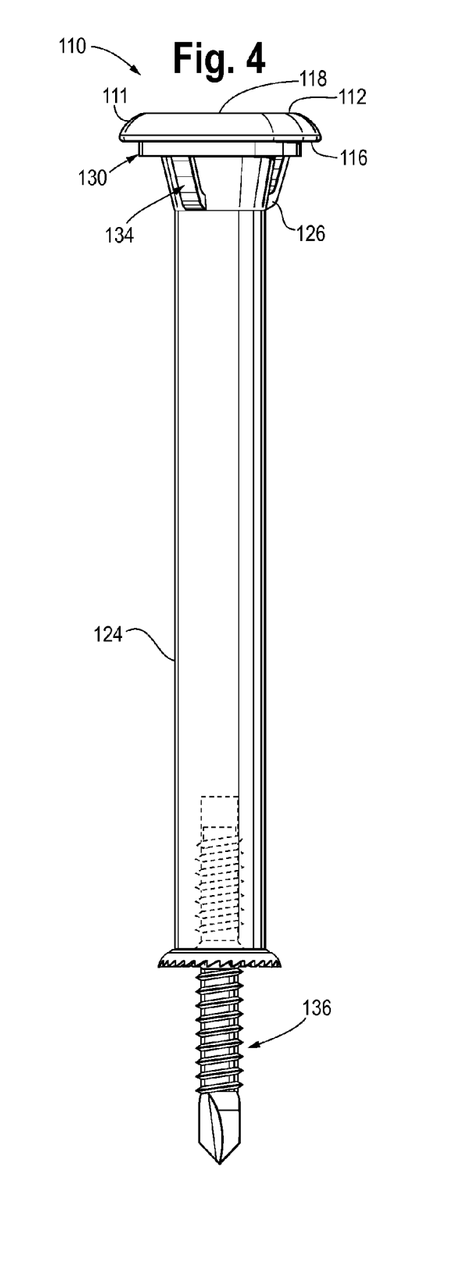
FIG. 4 is a side view of the thermal break fastener of FIG. 3 in an assembled form.

The head 111 includes a generally circular top side 112, a rounded edge and an underside 116. The head 111 includes a drive recess 118 to accept a drive bit, such as a Phillips-style driving bit, a hexagon drive bit or the like, or can be formed with an angled formation extending away from the top surface, such as a hex bolt.

A recess 122 is formed in the underside 116 of the head 111 to accommodate the seal 130. To secure the seal 130 to the fastener 110, at the head recess 122, an anti-back-out lock 126 can be formed at the transition of the shank 124 and the head 111. The lock 126 can include an angled wall 128 between the shank 124 and the head that terminates at the head 111. The wall 128 widens toward the head 111. A small step 154 in the shank 124 can be formed at the base of the wall 128.

Figure 5:
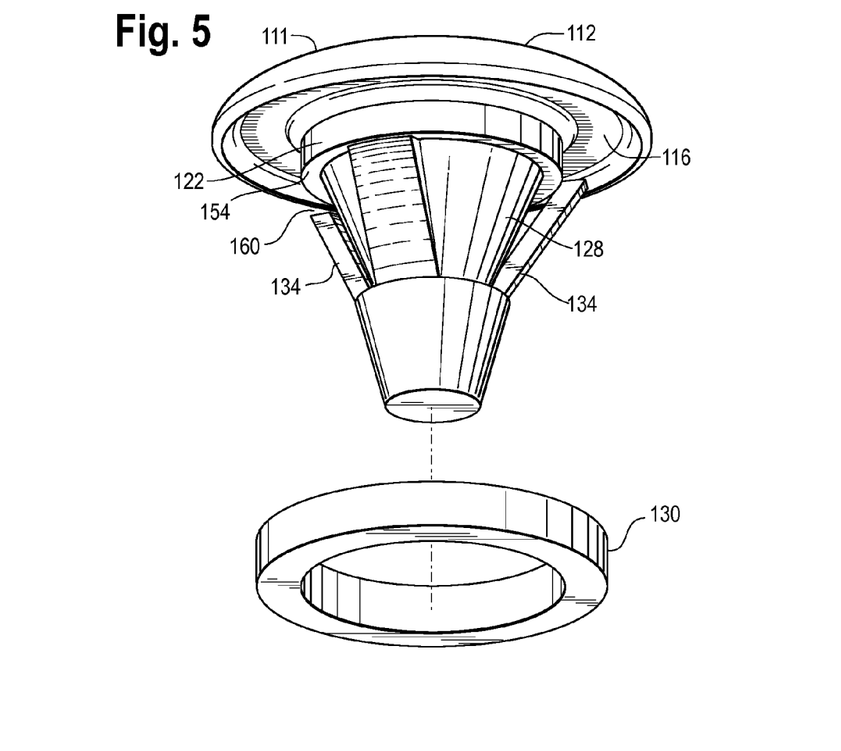
FIG. 5 is an exploded view of the sealing plug portion of an alternative embodiment of the fastener.
Figure 6:
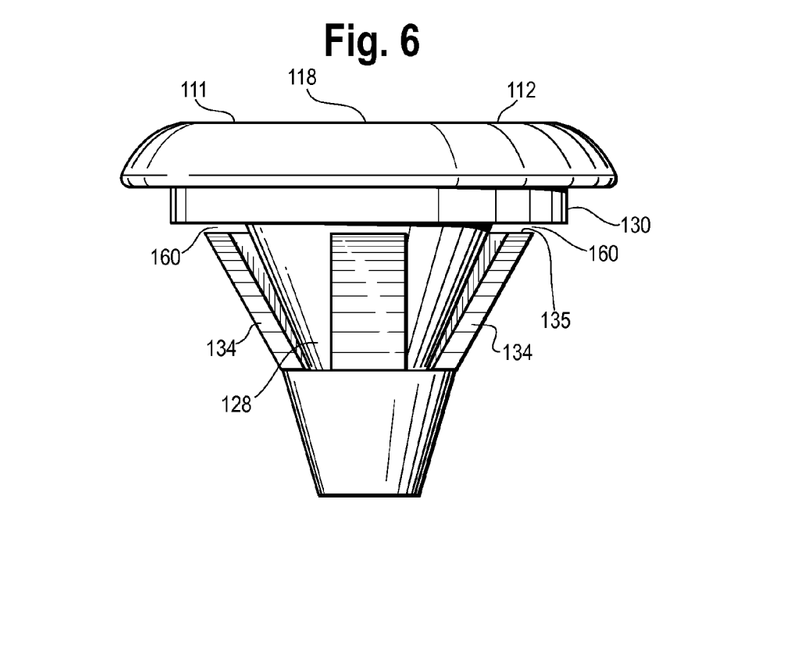
FIG. 6 is a side view of the head of the alternative embodiment.

As shown in FIGS. 5-6 a plurality of outwardly extending flexible fingers 134 extend from the wall 128 toward the head 111. The fingers 134 extend to a location 160 below the head 111, thus defining a space 160 between the ends 135 of the fingers 134 and the head 111. The seal 130 is fitted into the space 160 and is secured in place by the fingers 134 which, once the seal 130 is passed over the fingers 134, flex back outwardly to hold the seal 130 in place between the ends 135 of the fingers 134 and the head recess 122.

Figure 7:
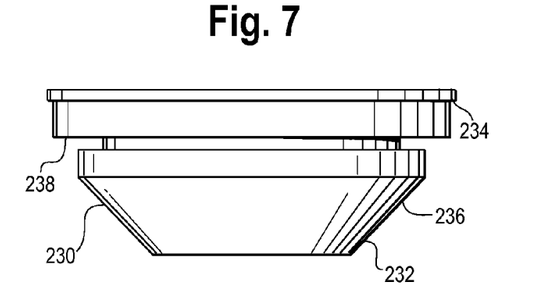
FIG. 7 is a side view of the alternative seal.
Figure 8:
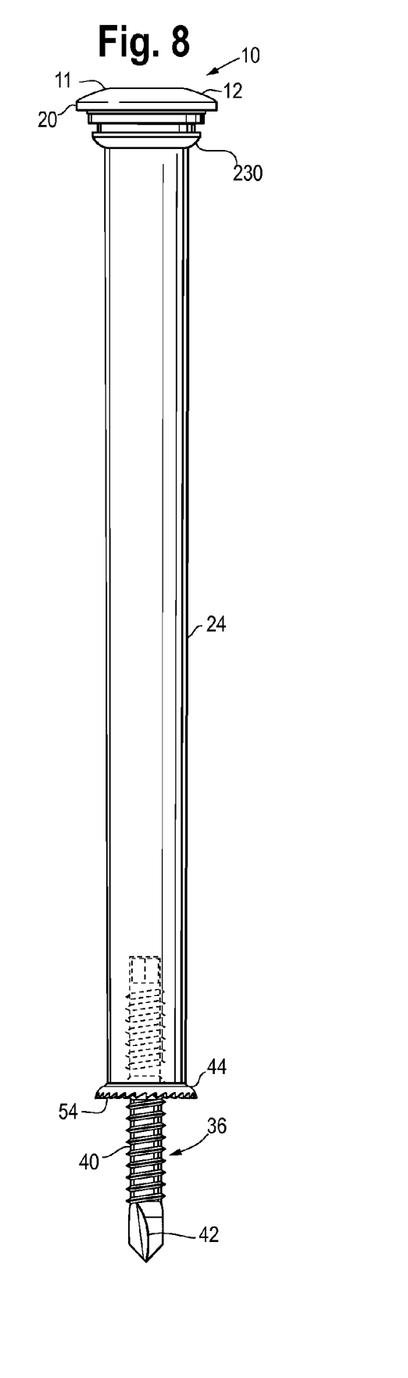
FIG. 8 is a side view of the thermal break fastener with the seal of FIG. 7.

An alternative seal 230 is shown in FIGS. 7 and 8. This seal 230 includes a body 232, a seal portion 234, and a depending conical portion 236. A recess or channel 238 is formed between the seal portion 234 and the conical portion 236.

In use, the fastener 10 is positioned with the self-drilling point 42 on the top panel. The driver is actuated and the fastener 10 is driven into the IMP. The point 42 penetrates the top panel and begins to penetrate the insulation. The hole in the top panel is about the same size as the point.

As the cutter 44 engages the top panel, it cuts a ring shaped piece of the top panel about equal to the size (diameter) of the cutter 44, and carries that ring shaped piece on the second threaded portion 40 at the cutter 44. The cutter 44 continues to cut through or compress the insulation.

Further driving of the fastener 10 brings the point 42 into contact with and through the lower steel panel and into contact with and into the substructure (steel deck). The fastener 10 stops when the cutter 44 contacts the substructure. The fastener 10 is then driven such that the head 11 and seal 30 are flush with or snug up against the top panel. The IMP is thus fastened to the substructure without the need for inserting insulation into the bore and repair or patching of the top steel panel. It will be appreciated by those skilled in the art that because the ring shaped piece of the top panel is carried on the driving/boring element 36 at the cutter 44, the ring shaped piece prevents the cutter 44 from cutting through the bottom steel panel.

Moreover, because of the thermally resistive properties of the polymeric fastener 10, it does not conduct heat (in either direction) as would a metal fastener. In addition, the polymeric fastener 10 is not subject to corrosion (e.g., rusting) as would a mild steel fastener.

Figure 9A:
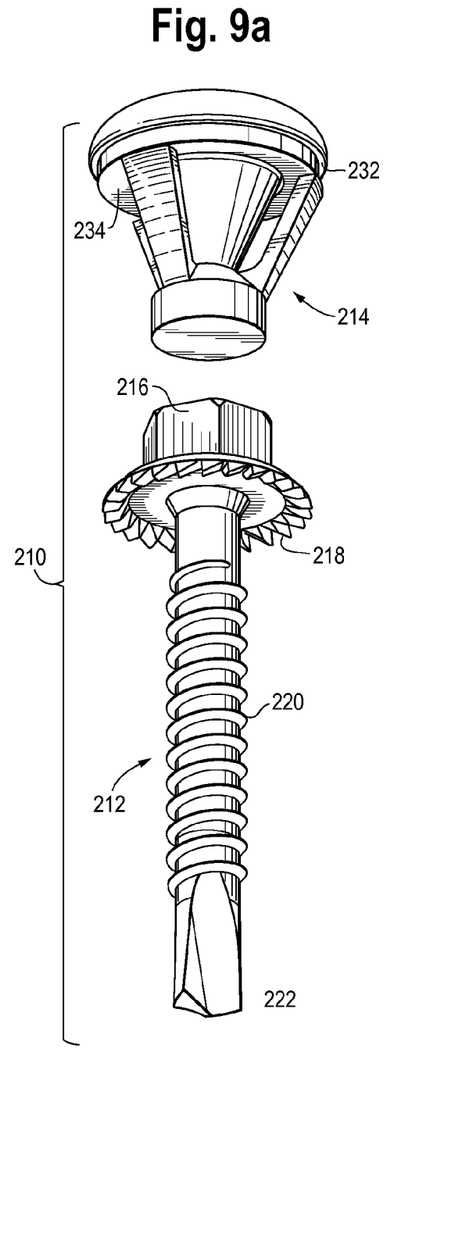
FIGS. 9a and 9b are perspective and side views of an alternative embodiment of a two piece thermal break fastener.
Figure 9B:
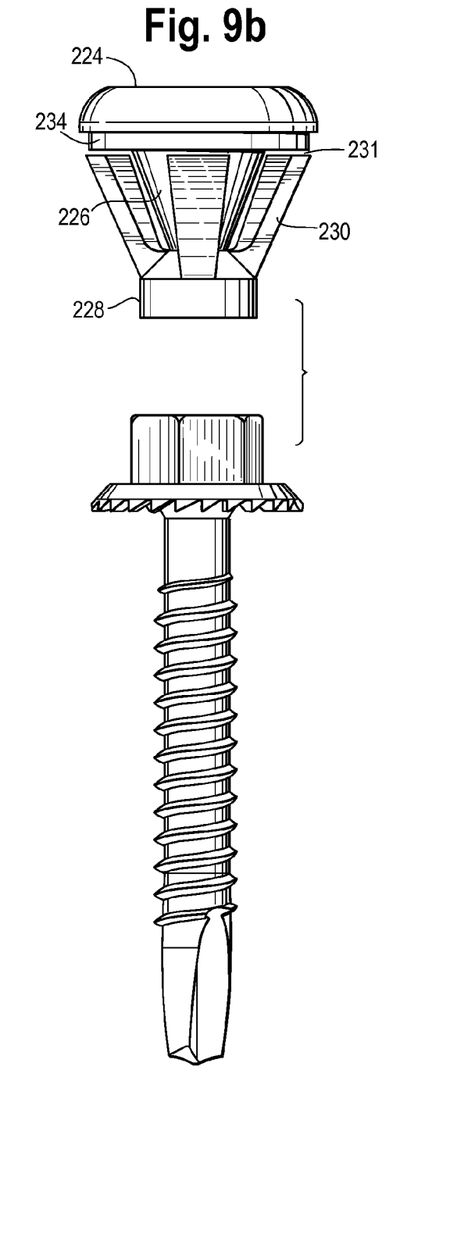

An alternate configuration of a two-piece thermal break fastener 210 is illustrated in FIGS. 9a and 9b. In this configuration, the driving/boring element 212 can be separate from a sealing head portion 214. The driving/boring element 212 includes a drive head 216, a self-counter-bore cutter 218, a threaded portion 220 and a self-drilling tip or point 222. The drive head 216 can be, for example, a hex-style drive as shown, or can be formed with a recess to accept a drive bit, such as a Phillips-style driving bit, a hexagon drive bit or the like.

In the illustrated embodiment, the self-counter-bore cutter 218 is positioned abutting or depending from the drive head 216, and can be formed integral with the drive head 216. The self-drilling tip 222 is of a known design. It is anticipated that the driving/boring element 212 is formed from metal, such as steel.

The separate sealing head 214 is similar to the fastener head 111 configuration of FIGS. 3 and 4, is used with the driving/boring element 212, and is shown in FIGS. 5 and 6. The sealing head 214 includes a head or cap portion 224, a depending tapered stem or transition 226 having a truncated conical shape and an end plug 228. Securing elements or flexible fingers 230 extend from the about the plug 228 upwardly toward the cap 224 and define a gap as indicated at 231 between the ends of the fingers 230 and a recess 232 in the bottom of the cap 224. A seal 234 is positioned in the gap 231 between the ends of the fingers 230 and the cap 224.

Figure 10A:
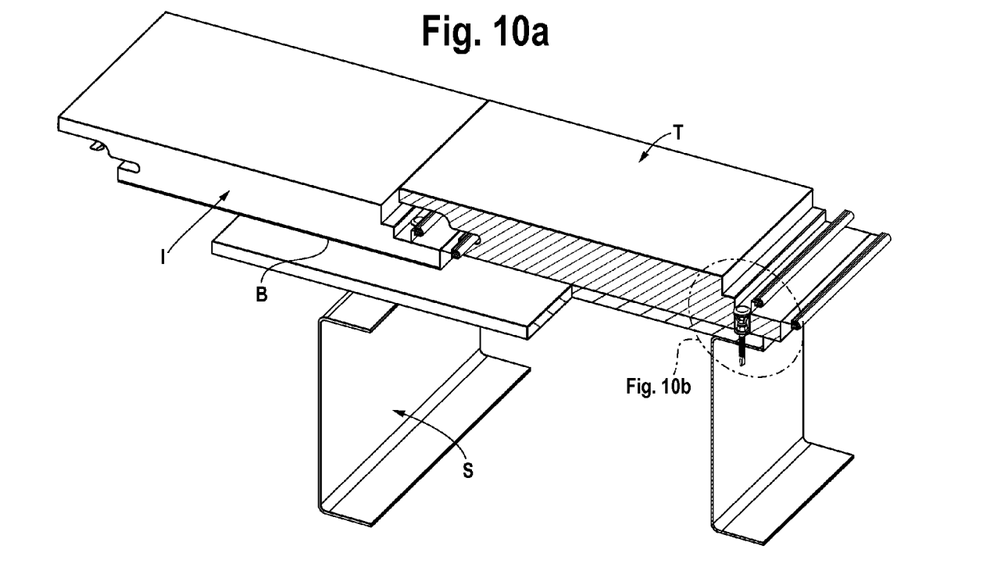
FIGS. 10a and 10b illustrate the fastener of FIGS. 9a and 9b in an exemplary IMP wall installation.
Figure 10B:
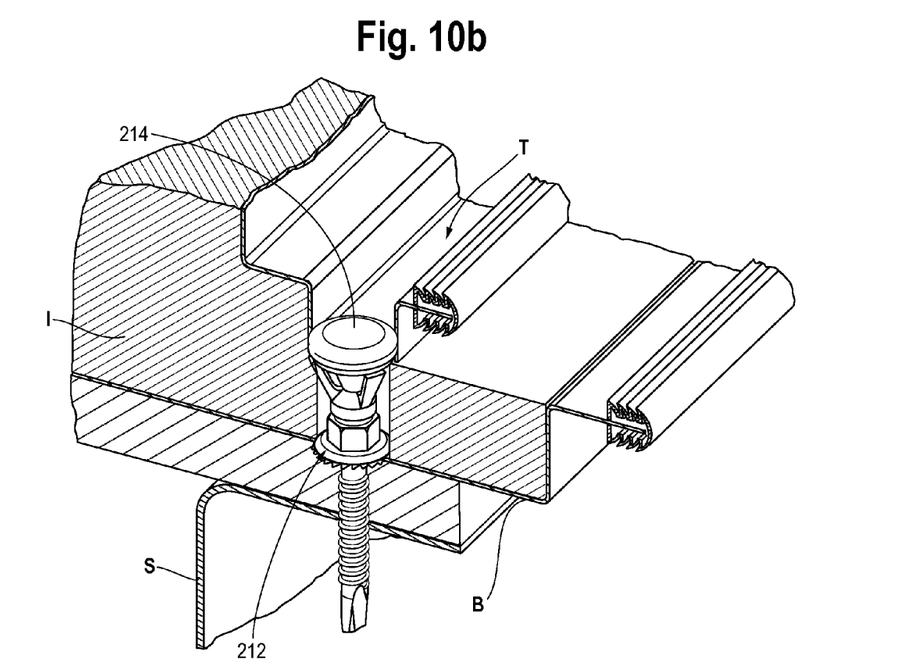

As illustrated in FIG. 10, it is anticipated that this two-piece configuration is used at thinner sections of the IMP, and can be used at transitions between panels. The driving/boring element 212 is driven through the top panel T and the insulation I. The hole in the top panel T is about the same size as the point 222.

The cutter 218 engages the top panel T and cuts a ring shaped piece from the top panel T about equal to the size (diameter) of the cutter 218, and carries that ring shaped piece on the threaded portion 220 at the cutter 218. The cutter 218 continues to cut through or compress the insulation I.

Further driving of the driving/boring element 212 brings the point 222 into contact with and through the bottom steel panel B and into contact with and into the substructure S (steel deck). The driving/boring element 212 is then driven such that the drive head 216 and cutter 218 are flush with or snug up against the inside surface off the bottom panel B. The IMP is thus fastened to the substructure S. Again, it will be appreciated by those skilled in the art that because the ring shaped piece of the top panel T is carried on the driving/boring element 212 at the cutter 218, the ring shaped piece prevents the cutter 218 from cutting through the bottom steel panel B.

The sealing head 214 is then inserted into the opening in the top panel T formed by the cutter 218. The cap portion 224 and seal 234 are sized so that they are larger than the opening formed by the cutter 218, but so that the flexible fingers 230 pass through the opening. As such, the cap and 224 seal 234 are positioned over the opening (on the top of the top panel T), and the fingers 230 are below the opening (below the top panel T). As the fingers 234 pass through the opening, they flex outwardly to capture the top panel T between the cap 224/seal 234 on top and the ends of the fingers 234 below, securing the sealing head in place 214.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

The invention claimed is:

1. A thermal break fastener comprising:
a head having a top side and an underside, the head having a diameter;
a shank depending from the underside of the head, the shank having an end having a longitudinal bore therein opposite the head, the shank formed from a thermally non-transmissive material, the shank having a diameter less than the diameter of the head;
a seal positioned on the shank; and
a driving/boring element, the driving boring element having a driving point and a self-counter-bore cutter spaced from the driving point, the self-counter-bore cutter having a diameter about equal to the diameter of the shank, the driving/boring element mounted to the shank with the self-counter-bore cutter disposed at about the end of the shank opposite the head.

2. The thermal break fastener of claim 1 wherein the head includes a recess in the underside thereof, and wherein the seal resides in the recess.

3. The thermal break fastener of claim 1 including a retaining element to retain the seal in place on the shank.

4. The thermal break fastener of claim 3 wherein the retaining element is an outwardly extending projection from the shank.

5. The thermal break fastener of claim 1 wherein the driving/boring element includes a threaded portion terminating at the driving tip and includes a securing portion on an end opposite the self-counter-bore cutter, the securing portion configured for receipt in the shank longitudinal bore.

6. The thermal break fastener of claim 1 wherein the self-counter-bore cutter has a disk-like shape and includes teeth at about a periphery thereof.

7. The thermal break fastener of claim 1 wherein the shank is formed from a non-metal material.

8. The thermal break fastener of claim 7 wherein the shank is formed from nylon or polyethylene terephthalate.

9. The thermal break fastener of claim 3 wherein the retaining element is a plurality of flexible fingers extending from the shank, spaced from and toward the head, and wherein a gap is defined between a free end of the flexible fingers and the underside of the head.

10. The thermal break fastener of claim 9 wherein the gap is sized to accommodate the seal between the free end of the flexible fingers and the underside of the head.

11. The thermal break fastener of claim 10 including a transition between the head and the shank, and wherein the flexible fingers extend from the shank at about the transition.

12. The thermal break fastener of claim 1 wherein the head and the shank are formed as a unitary element.

13. A thermal break fastener, comprising:
a head having a driving element;
a shank integral with and depending from the head, the shank having a diameter less than a diameter of the head, the head and shank formed from a thermally non-transmissive material; and
a driving/boring element mounted to the shank opposite the head, the driving/boring element having a penetrating tip at an end thereof and a self-counter-bore cutter spaced from the penetrating tip, the self-counter-bore cutter having a diameter about equal to the diameter of the shank.

14. The thermal break fastener of claim 13 including a seal positioned on the shank between the head and the driving/boring element.

15. The thermal break fastener of claim 14 including a retaining element configured to retain the seal in place.

16. The thermal break fastener of claim 15 wherein the retaining element is a projection extending outwardly from the shank.

17. The thermal break fastener of claim 15 wherein the retaining element is a plurality of flexible fingers extending from the shank, spaced from and toward the head, and wherein a gap is defined between a free end of the flexible fingers and an underside of the head.

18. The thermal break fastener of claim 13 wherein the shank is formed from nylon or polyethylene terephthalate.

19. A thermal break fastener, comprising:
a driving/boring element having a drive head and a penetrating tip at an end opposite the drive head, the driving boring element including a self-counter-bore cutter spaced from the penetrating tip, the self-counter-bore cutter having a diameter;
a sealing head, the sealing head having a having a cap portion having a diameter greater than the diameter of the self-counter-bore cutter, a stem portion depending from the cap portion and a securing element extending from the stem portion; and
a seal positioned on the sealing head.

* * * * *